United States Patent

Bosonnet et al.

[15] 3,657,483

[45] Apr. 18, 1972

[54] INTERFACE CIRCUITS FOR A PCM TIME MULTIPLEX SWITCHING CENTER

[72] Inventors: Marc Edgar Marie Bosonnet, Paris; Michel Andre Robert Henrion, Boulogne-Billancourt, both of France

[73] Assignee: International Standard Electric Corporation, New York, N.Y.

[22] Filed: Apr. 22, 1970

[21] Appl. No.: 30,913

[30] Foreign Application Priority Data

Apr. 22, 1969 France ....................2540

[52] U.S. Cl. ....................179/15 AT

[51] Int. Cl. ....................H04j 3/00

[58] Field of Search ....................179/18 ES, 2 DP, 15 BM, 15 BS; 178/69.5 R; 340/146.1

[56] References Cited

UNITED STATES PATENTS

| | | | |
|---|---|---|---|
| 3,299,210 | 1/1967 | Bandy | 179/2 DP |
| 3,303,285 | 2/1967 | Brown | 179/15 BM |
| 3,530,242 | 9/1970 | Martens | 178/69.5 R |
| 3,558,811 | 1/1971 | Montevecchio | 179/69.5 X |
| 3,571,794 | 3/1971 | Tong | 340/146.1 |
| 3,253,262 | 5/1966 | Wilenitz | 179/18 ES |

*Primary Examiner*—Ralph D. Blakeslee

*Attorney*—C. Cornell Remsen, Jr., Walter J. Baum, Percy P. Lantzy, J. Warren Whitesel, Delbert P. Warner and James B. Raden

[57] ABSTRACT

In a switching center controlled by two computers operating, for example, in the load-sharing mode, each of said computers has an access to each peripherical unit through an interface circuit. This interface has two functions:

Retiming between the computer clock and the PCM clock,

Preselection of the address concerned, in a peripheral unit, by an instruction sent by the computer and transmission of the data contained in said instruction.

5 Claims, 19 Drawing Figures

Inventors
M.E.M.Bosonnet-M.A.R.Henrion
2-3
By O. O. Warner
Attorney

INTERFACE CIRCUITS FOR A PCM TIME MULTIPLEX SWITCHING CENTER

The present invention concerns the interconnection or interface circuits placed between the different peripheral control devices of a PCM (pulse code modulation) switching center and the "switching computer" which is used as the centralized control unit of said center.

More precisely the present invention concerns the two interfaces placed between said peripheral devices and two computers. These latter operate under the control of stored programs either in load sharing mode (the two computers share the job) or in time sharing mode (a computer performs one job while the other is waiting). In all cases, when a computer, or the interface that is associated to it, breaks down, an important part, or the whole, of the traffic can be assumed by the other one.

Each of the two interfaces assumes the following functions:

Adaptation of the data rates of the computer and of the switching center which are equipped with different and non-synchronized clocks.

Selection of the peripheral device with which the computer wants to exchange information.

A primary object of the present invention is therefore to provide an interconnection circuit which allows the adaption of the data rates of the switching computer to those of the PCM switching center.

Another object of the invention is that said circuit assumes, by interpreting the information supplied by the computer, the selection of the peripheral device, of the word and of the part of this word in which data must be collected or modified.

The computer sending an instruction during a duration defined by a signal Pd appearing at each of its repetition periods of duration TI, the invention is characterized by the fact that the interface has a four-position sequential S0, S1, S2, S3 which is initially in position S0, that the reception of an instruction at a time slot Pd controls the advance of this sequential in phase S1, that the first signal tS′ appearing after the end of the signal Pd sets the sequential in phase S2, that the two following signals tS′ set the said sequential in phase S3, then in phase S0, a signal tS′ characterizing the leading edge of a synchronous time signal tS at the central exchange time base (PCM).

The computer sending, for the execution of operations on a given address, an initial instruction OTAo followed by execution instructions OTA (data modification order) or INA (data collection order), another characteristic of the invention is the fact that the instruction OTAo contains unit, word, address preselection information which is processed in the interface and transmitted to the unit at time slots tS, that an instruction OTA or INA transmitted to the unit at time slots tA following said time slots tS contains on one hand the data to be written at the preselected address and on the other hand the write control code CB which comprises 1 digits only in the positions corresponding to bytes in which a writing has to be done, that the instruction INA contains a code CB equal to zero so that it does not modify the content of the preselected address and that the content of the address is then transmitted to the computer through the interface.

Another characteristic of the invention is the fact that the preselection information supplied by the instruction OTAo and contained in the bits 6 through 16 of the bus HBP connecting the computer to the interface are processed in the interface to obtain an unit selection signal Uj of duration tS + tA and, eventually, an address preselection code Cm, that the information contained in the bits 1–5 of said bus constitute a code CW in which the leftmost bit H1 (H2, H3 etc . . . ) of value 1 means that the corresponding word W1 (W2, W3) is preselected for the first (second, third) received instruction OTA or INA, that the interface comprises an identification circuit which provides, at each time slot S2.tA, a word preselection code CR comprising digits 0 at each position except at the position where the leftmost bit of the code CW is equal to 1, that these preselection codes Cm, CR are sent on busses joining the interface to the units at the time slots $\overline{F}$.S2.tS and S3.tS while the signal Uj is sent to the preselected unit, a signal F characterizing the instruction OTAo, that this signal controls, in said unit, the reception of the codes Cm, CR, and that these codes control the preselection of the word and of the address.

Another characteristic of the invention is the fact that the content of each instruction OTA or INA is transmitted on a bus joining the interface to the units at times $\overline{F}$.S2.tA and S3.tA, that the signal Uj controls the reception of these informations by the unit Uj and that the code CB controls the writing at the preselected address.

The above mentioned and other features and objects of this invention will become apparent by reference to the following description taken in conjunction with the accompanying drawings in which:

FIGS. 1*a* through 1*g* represent signal diagrams concerning the time base H(PCM), FIGS. 2*a* through 2*e* represent signal diagrams concerning the time base H(CP), FIG. 3 represents the general diagram of a PCM switching center;

Figures 1A, 1B, 1C, 1D, 1E, 1F, 1G:
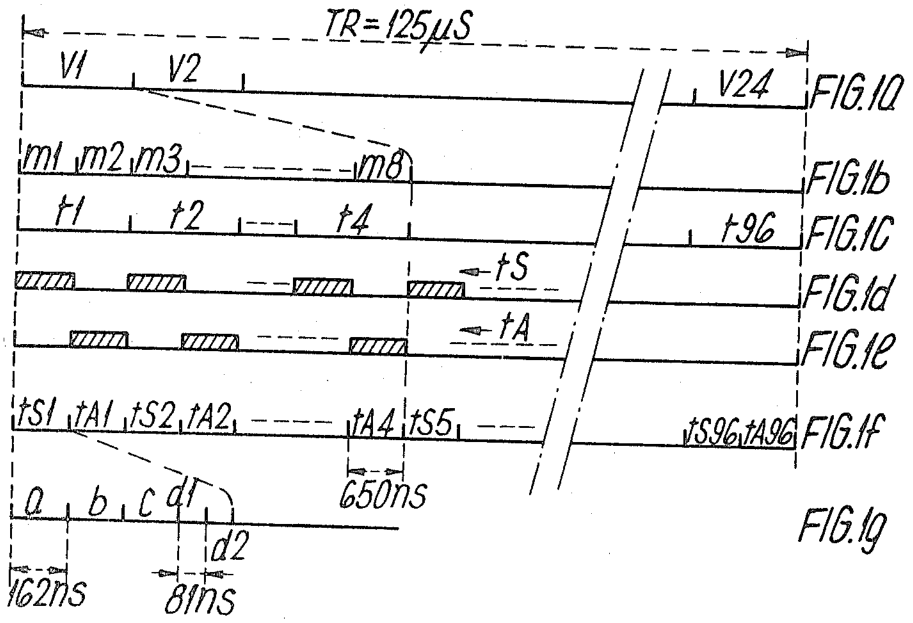

To make easier the reading of the description, this one will be divided into chapters as follows:

1. The clocks
2. The PCM switching center
3. The interconnections
4. The instructions transmitted by the computer
5. The interface and its operation
   - 5.1 Generalities
   - 5.2 The selections
   - 5.3 The data transfers
6. The input-output circuit of a peripheral unit.

1. The clocks.

The main characteristics of the PCM switching center considered as an example in the present description are shown in the Table 1, the diagrams of the signals delivered by the central exchange clock H (PCM) being given in the FIGS. 1*a* through 1*f*.

TABLE 1

[Characteristics of the PCM system and of the clock signals (exchange time base HS)]

| Symbol | Unit duration, μs. | Cycle duration, μs. | Meaning | Figure |
|---|---|---|---|---|
| TR | 125 | | Duration of the repetition period or frame (sampling frequency: 8 kc.) | 1.a |
| *m* | | | Number of channels in a junction (*m*=24) | |
| V1, V2 . . . V24 | ≃5. 2 | 125 | Channel time slot | 1.a |
| *P* | | | Number of digits of a message and number of junctions in a group (*p*=8) | |
| *m*1, *m*2 . . . *m*8 | 650 | 5. 2 | Digit time slot | 1.b |
| *t*1 . . . *t*96 | 1, 300 | 125 | Base time slot | 1.c |
| Ct | | | The set of 96 base time-slot codes | |
| *t*S | 650 | | Synchronous time slots | 1.d |
| *t*A | 650 | | Asynchronous time slots | 1.e |

TABLE 1–Continued

[Characteristics of the PCM system and of the clock signals (exchange time base HS)]

| Symbol | Unit duration, μs. | Cycle duration, μs. | Meaning | Figure |
|---|---|---|---|---|
| tS1 . . . tS96 | 650 | 125 | Interleaved sets of signals tS and tA | 1.f |
| tA1 . . . tA96 | 650 | 125 | | |
| a, b, c, d | 162.5 | 650 | Narrow time slot signals | 1.f |
| d1, d2 | ≃81 | 162.5 | Ultra-narrow time slot signals dividing a signal d into 2 equal time slots | 1.g |
| Ct.tS | | | Cyclical selection at synchronous time slots tS | |

The signals of FIGS. 1*d* and 1*e* are elaborated as follows: during a repetition period or frame, the clock H (PCM) provides a succession of codes characterizing the time division of this frame into $g = 192$ time intervals defined by the succession of eight-digit codes referenced Ct. The seven most significant digits of these codes define 96 basic time slot signals t1, t2 . . . t96. Each one of these time slots is divided, according to the value of the least significant digit, into two equal parts in order to obtain the two interleaved trains of 96 signals constituting the synchronous time signals tS1, tS2 . . . tSx . . . tS96 and the asynchronous time signals tA1, tA2 . . . tAy . . . tA96. The set of codes Ct which are only used constitutes the three-fourths of the whole set of eight-digit codes, the chosen codes being those comprising a 1 in one of the two most significant positions.

The FIGS. 2*a* through 2*e* are the diagrams of signals concerning the association of the switching center with the computers CP1 and CP2 designed to transmit or receive information with a frequency lower than 200 kHz.

Figures 2A, 2B, 2C, 2D, 2E:
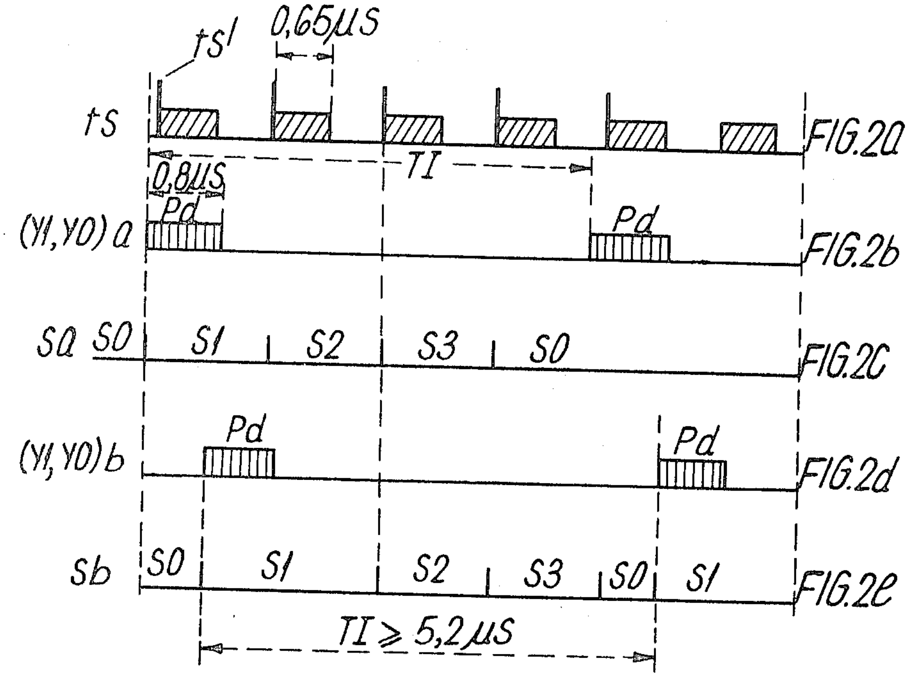

The FIG. 2*a* represents the succession of signals tS delivered by the clock H (PCM). On this figure, pulses tS′ symbolize the leading edge of signals tS.

The FIG. 2*b* represents signals Pd with a duration of 0.8 μs and a repetition period TI which are elaborated by the clock H(CP) of each computer. These signals define the time slots reserved to the exchanges of data between the computer and a peripheral unit. They can take any time position with respect to the signals tS : thus the FIG. 2*d* shows a position of these signals different from that shown on the FIG. 2*b*.

An interface circuit IF associated to each computer controls the selection of peripheral units at the rate of the clock H(PCM), and the data transfers between this unit and the computer. It comprises a sequential defining four phases S0, S1, S2, S3 which controls the conversion from the time base H(CP) to the time base H(PCM). As it can be seen on the FIGS. 2*b*, 2*c* on one hand and 2*d*, 2*e* on the other hand, this sequential advances in position S1 when the computer calls by sending a signal Pd [advance at times H(CP)] and it advances in position S2 for the condition Pd.tS′ [advance at times H(PCM)]. Afterwards, each signal tS′ controls its progression by one position.

It is therefore seen that, for a peripheral unit, each of the phases S1, S2, S3 covers at least a basic time slot tS + tA. The minimum value TI = 5.2 μs has been chosen so that the phase S0 lasts at least two narrow time slots. The exact conditions of advance of the sequential are given in the table 5.

2. The PCM switching center

During the description, we will mention some French patents and patent applications. They will be referenced as follows :

a. French Patent No. 1,586,200 filed on Sept. 12, 1968 and entitled : "Synchronization circuit in a PCM central exchange" (M.J. Herry et al. 3-2).

b. Patent application No. 6901888 filed on Jan. 30, 1969 and entitled : "Time-multiplex switching center," (J.G. Dupieux et al. 5-1-13-1).

c. Patent application No. 6904113 filed on Feb. 19, 1969, and entitled : "Signalling supervision unit," (B.P.J. Durteste et al. 1-2-2).

d. Patent application No. 6906194 filed on Mar. 6, 1969 and entitled : "Scanning and path search circuits," (J.G. Dupieux et al. 6-2-1-14).

e. Patent application No. 6908270 filed on Mar. 21, 1969 and entitled : "Signalling unit for a time multiplex switching center," (M.E.M. Bosonnet et al. 1-1-15).

f. Patent application No. 6909623 filed on Mar. 31, 1969 and entitled : "Scanning circuits in a central exchange," (B.P.J. Durteste et al. 3-2-16).

The PCM switching center to which are associated the interfaces according to the invention can be, by way of an example, the tandem switching center whose switching stage has been described in the patent application referenced (b), and several peripheral devices in the patent applications referenced (d), (e) and (f).

Figure 3:
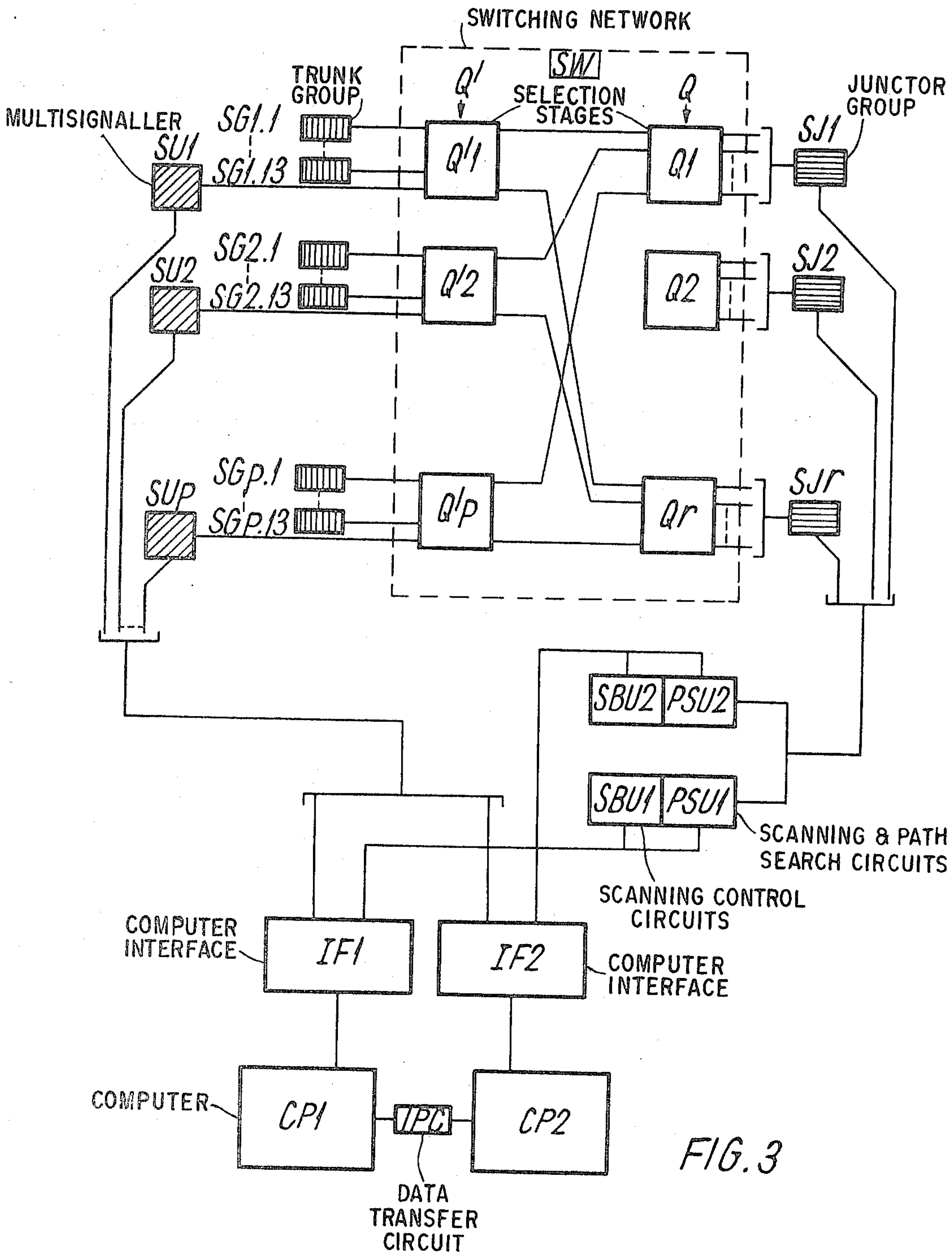

The FIG. 3 represents the general diagram of this switching center which comprises :

- The switching network SW comprising two selection stages Q′ and Q (switches Q′ 1 to Q′p, Q1 to Qr) interconnected in a well know way. As an example, the switches comprise each 14 inputs and 14 outputs.
- The trunk groups 1–13 (symbol for "1 to 13" associated to each switch of the stage Q′. Those associated to the switch Q′1 constitute the supergroup SG1 and are referenced SG1.1 – SG1.13.
- The superjunctors SJ1 – SJr associated to the switches Q1–Qr and comprising each 14 junctors SJ1.1 – SJ1.14 (they are not represented on the figure).
- The multisignallers SU1 - SUp which are peripheral units connected to the network in the same way as trunk groups and which have access, through said network, either to the channels of the trunks or to the junctors. Each one is constituted by a memory MSU comprising $g/2 = 96$ addresses.
- The scanning and path search units PSU1, PSU2 which are peripheral units having a direct access to the junctors.
- The scanning control units SBU1, SBU2 respectively associated to the units PSU1, PSU2 and which are also considered as peripheral units.
- The computers CP1, CP2 and the interfaces IF1, IF2 which are associated to them. Each interface may control the selection, through its output bus, of each peripheral unit SU, PSU and SBU.
- The circuit IPC that controls the data transfers between CP1 and CP2.

The function of the network SW and of the junctors which are associated to it is to realize the time and space switchings needed to establish connections between two channels belonging to trunk groups or to multisignallers.

These switchings have been described in a detailed way in the patent application referenced (b) and they will only be referred to again in a concise way.

A connection such as defined above necessitates, for connecting two time multiplex channels referenced *x* and *y*, the setting up of two half-connections:

- a synchronous half-connection Sw established at the synchronous time tSx,
- an asynchronous half-connection Aw established at the asynchronous time tAy.

For each of these half-connections, those must be performed first a space switching between the group of trunks and the chosen junctor that comprises a junctor data memory MDJ with *g*/2 addresses, the address *x* of which is assigned to the temporary storing of messages which come from the channels *x, y* and which are assigned to them and, second, a time switching allowing to transmit at time tAy (tSx) a message written in the memory at time tSx (tAy).

The space switching is controlled, for each output of a multiselector, by two space path memories which are associated to it and which comprise each $g/2$ addresses selected in a cyclic way by the codes Ct.tS. Each address contains the code allowing to select one out of 14 inputs at the time slot when it is read. It is thus found, for an output of a multiselector of the stage Q'(Q), the synchronous space path memory MSS' (MSS) the content of which is processed at time slots tS (setting up of half connectors Sw) and the asynchronous space path memory MSA' (MSA) the content of which is processed at time slots tS (setting up of half-connections Aw).

The time switching is done in the memory MDJ the address $x$ of which can be selected successively, at each frame, once in a synchronous way at tSx and once in an asynchronous way at tAy by the code Cx (code of the address $x$) read in the address $y$ of a time path memory MCT comprising, as the other memories, $g/2$ addresses.

At each of these time slots the message written in the address $x$ of MDJ is transmitted on the corresponding channel (channel $x$ at tSx, channel $y$ at tAy), and the message received on this channel is written in same address. Thus, if $x < y$, the message received at tSx on the channel $x$ is transmitted at tAy to the channel $y$: this operation constitutes the time switching.

Figure 4:
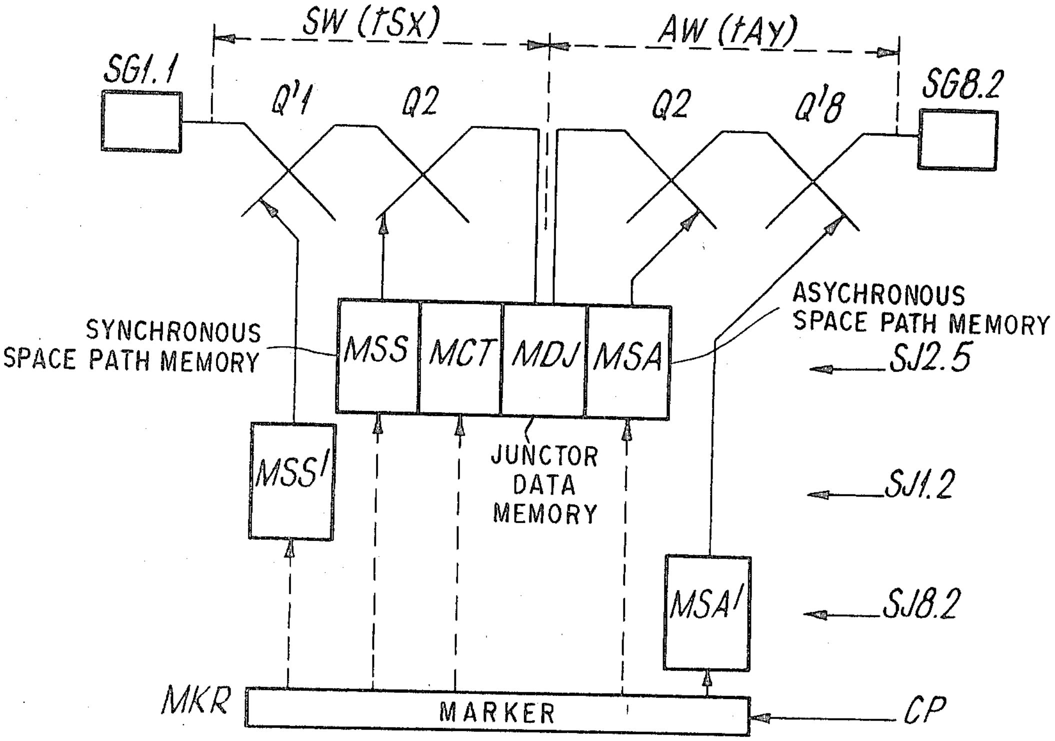
FIG. 4 represents the "unfolded" diagram of a connection between two channels.

The FIG. 4 is an "unfolded" diagram of such a connection between SG1.1:tx (channel x of the group SG1.1) and SG8.2:ty. In this figure the two half-connections have been shown separately but it is understood that all the switches represented in a symbolic way belong to the switching network SW.

In this network, and as it has been described in the patent application referenced (b), the memories are grouped in the junctors in such a way that the junctor SJ1.1, for example, comprises, besides the memories MDJ and MCT, the memories MSS, MSS', MSA, MSA' associated to the outputs 1 of the switches Q'1 and Q1. Consequently, for a conventional interconnection diagram between the stages Q' and Q of the network SW, the connection chosen as an example uses memories placed in the junctors SJ2.5, SJ1.2 and SJ8.2. The access to these memories for code modification, code collection or cyclical searches is done either by direct access with the help of a PSU (to which is associated a SBU) or through the switching stage with the help of a SU.

3. The interconnections

The peripheral units represented on the FIG. 3 exchange data with the computer CP through the interfaces IF1, IF2. The formatting of the input-output circuits associated with said peripherals is variable, but it presents the following common features:

A word W comprises 16 bits.

Each word W is divided into 4 bytes of 4 bits which are individually addressable.

The Table 2 represents the word disposition of these circuits. In this table, the second column indicates the reference of the patent application in which the device or peripheral unit has been described. In the two right columns, each reference designates a word.

Figures 5, 6, 7:
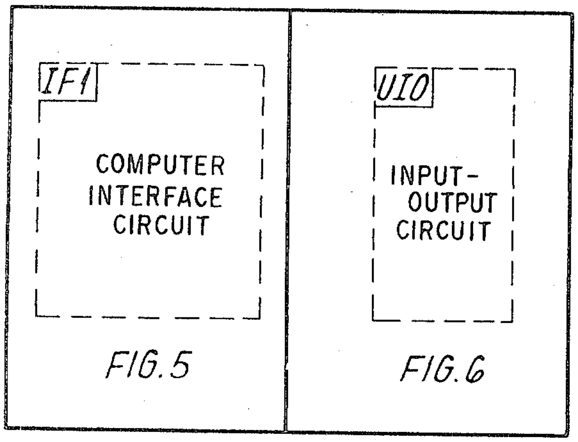
FIG. 5 represents the detailed diagram of an interface IF.
FIG. 6 represents the detailed diagram of an input-output circuit UIO associated to a peripheral unit.
FIG. 7 represents the assembly drawing of FIGS. 5 and 6.
Figure 5:
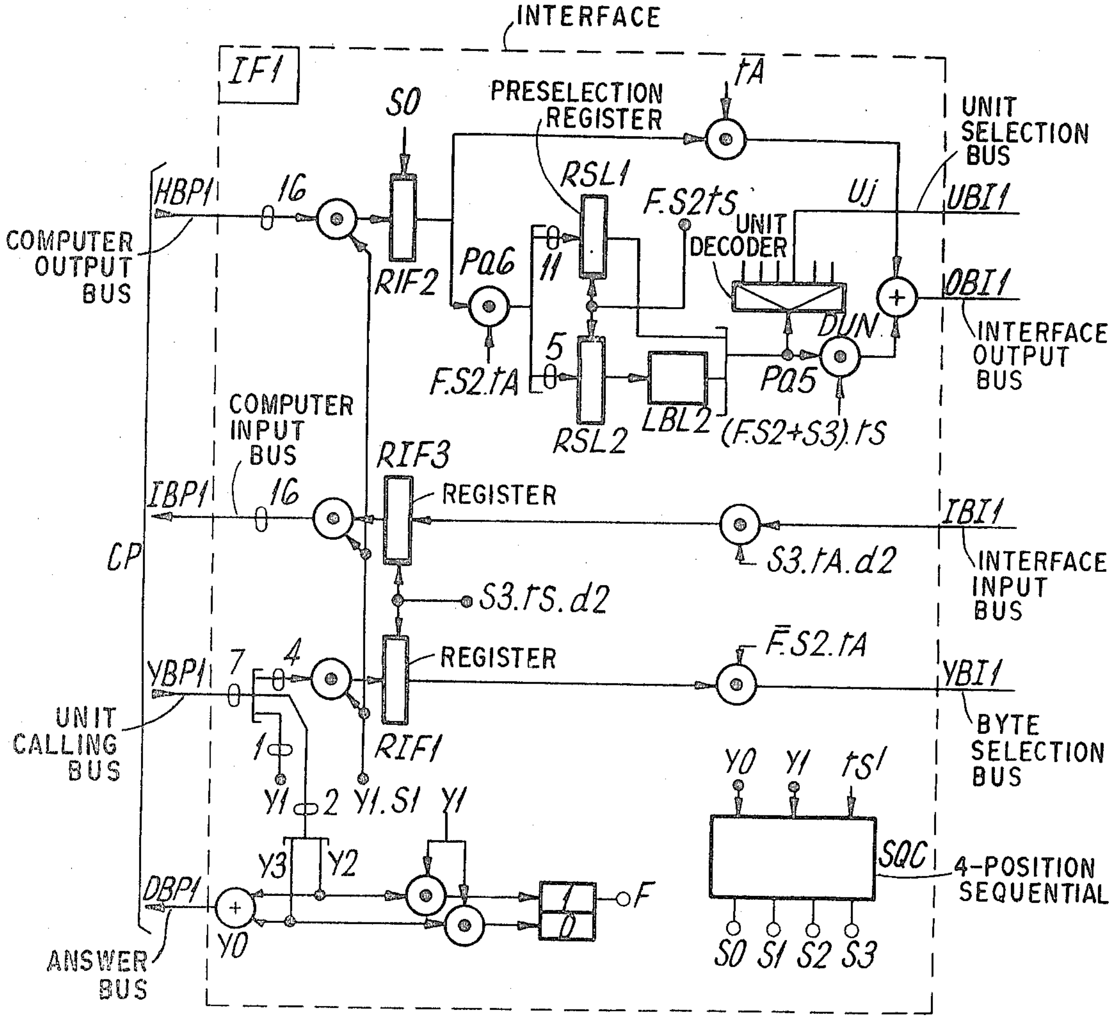
Figure 6:
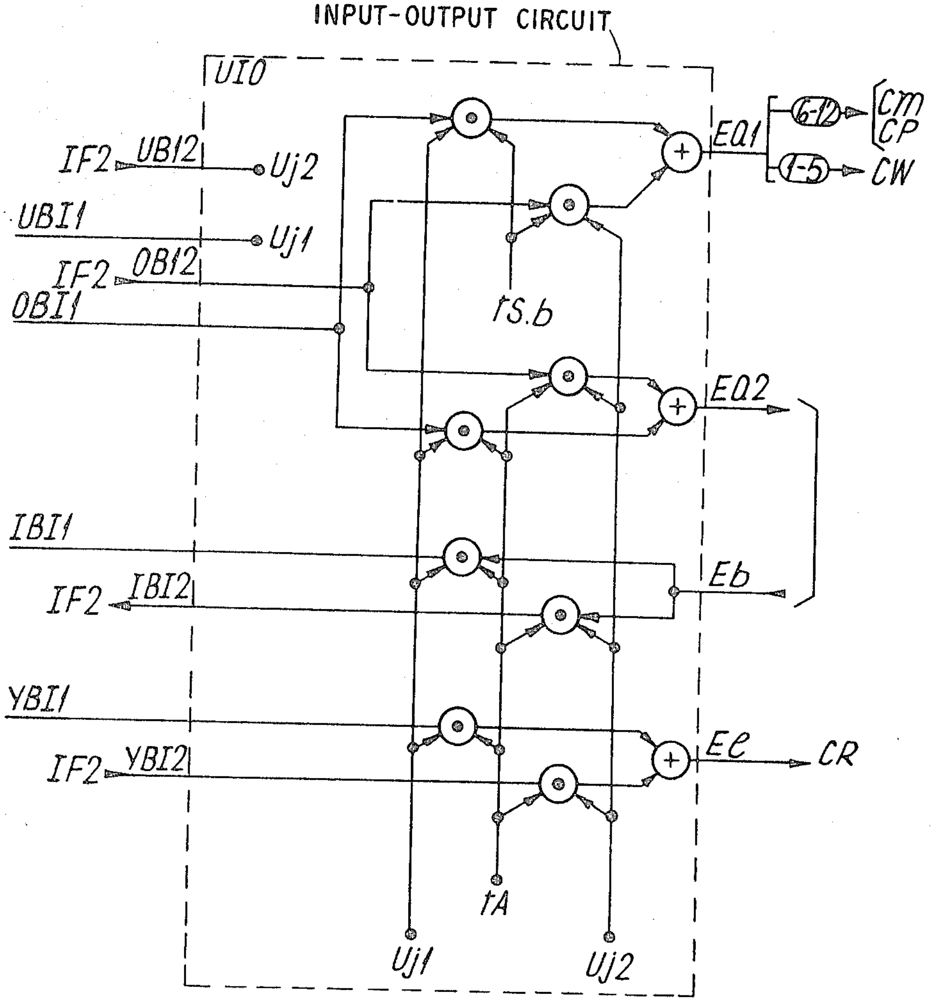

The FIGS. 5 and 6 represent respectively the detailed diagram of the interface IF1 associated to the computer CP1 and the input-output circuit UI0 placed in a peripheral unit such as the unit Uj. The FIG. 7 indicates the connecting modes of these figures.

The computer CP1 is connected to the interface IF1 by the following busses:

Unit calling and byte selection bus YBP1 comprising 16 conductors,

Computer output bus HBP1 comprising 16 conductors,

Computer input bus IBP comprising 16 conductors,

Answer bus DBP1 comprising one conductor.

The interface IP1 is connected to the circuit UI0 of the unit Uj by the following busses:

Unit selection bus UBI1 comprising one conductor,

Byte selection bus YBI1 comprising four conductors,

Interface output bus OBI1 comprising 16 conductors,

Interface input bus IBI1 comprising 16 conductors.

It is seen on the FIG. 6 that the circuit UI0 is connected to the interface IF2 by similar busses referenced UBI1, YBI2, OBI2, IBI2.

As it has been seen when describing the clock (CP) in relation with the FIG. 2e, the data transfers between the computer and its interface are done at time slots defined by the signals Pd. In the interface, the sequential defines phases S1 through S3 with a minimum duration equal to a basic time slot and in which the time slot tA is reserved to data transfers between the interface and the selected unit.

4. The instructions transmitted by the computer

For a given operation concerning a unit Uj, the computer CP sends to the interface, at time slots defined by the signals Pd (FIGS. 2b and 22) a succession of instructions on the buses YBP and OBP. These are:

1. The initial instruction OTAo: It is identified, in the interface, by the setting up of the condition F. This instruction comprises the preselection information identifying the unit Uj, the address $m$ (in the case of a multi-signaller SU or of a scanning control circuit SBU) and the information for the identification of the concerned words. These informations are processed in the interface and stored in several devices at a time slot ts. They are used at the following time slot tA.

2. The execution instructions: They are identified by the presence of a signal $\bar{F}$, and are of two types:

The instruction OTA containing on one hand the selection information of the concerned bytes (code CB) and on the other hand the new data to be written in said bytes (codes CD1–CD4).

The data collection instruction INA in which CB = CO. These instructions are transmitted at the time slot tA to the preselected unit and the code CB is used as a write control signal if CB ≠ CO.

Figure 8:
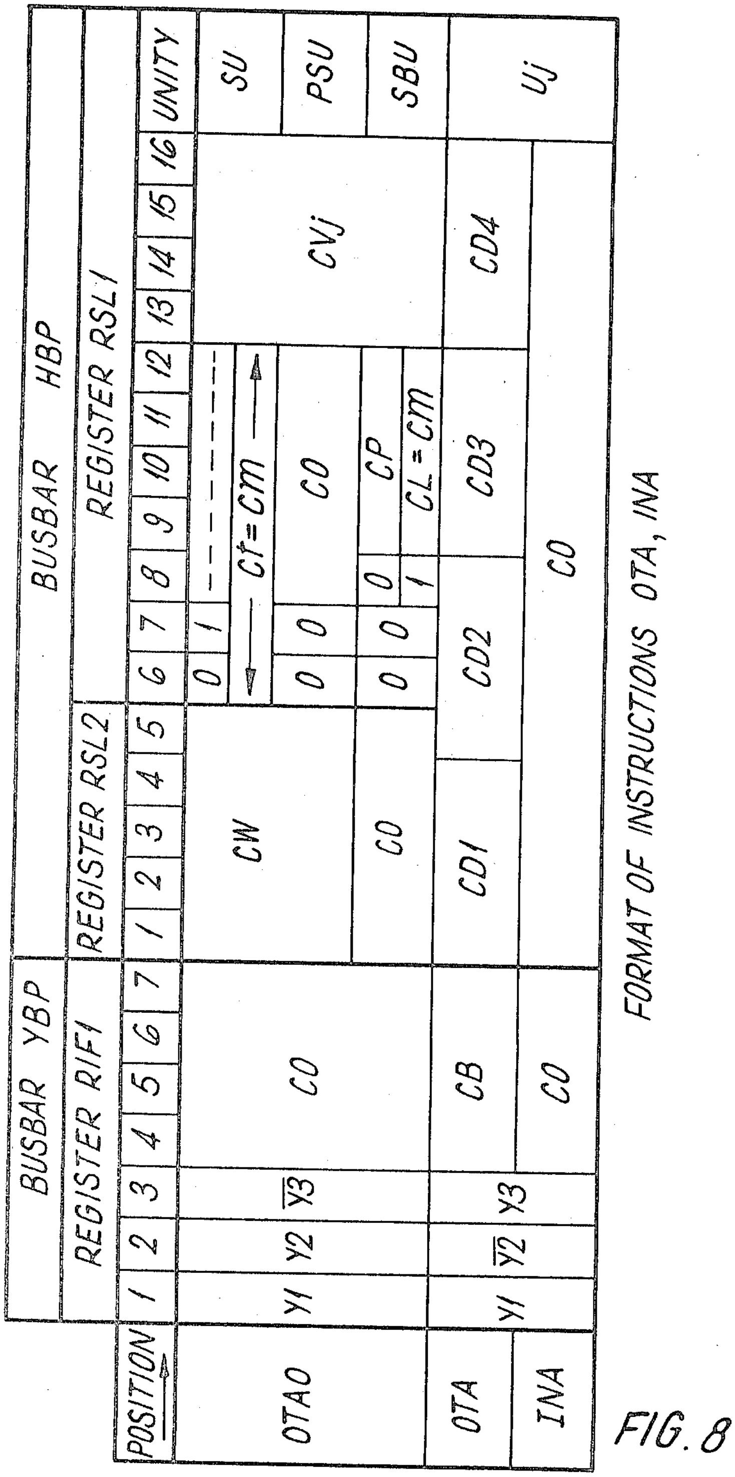
FIG. 8 represents the format of instructions OTAo, OTA, INA received from the computer CP.

The FIG. 8 and the Table 3 represent the format of these instructions. In this figure and this table each wire of a bus has been called position and, later on, this same word will designate the flipflop of a register to which is connected this wire. The expression "positions 4–7" means "positions 4

TABLE 2.—FORMAT OF THE PERIPHERAL UNITS I/O CIRCUITS

| Unit | Patent application | Input | Output | Format (number of words) | Reference of the I/O circuit: Memory | Register |
|---|---|---|---|---|---|---|
| SU | (e) | X | X | 2 | M1 and M2 | |
| PSU | (d) | X | | 5 | | Rg1 to Rg5. |
| | | | X | 1 | | Rg5. |
| SBU | (f) | X | | 2 | MRE | |
| | | | X | 1 | MRE | |

TABLE 3

Data transmitted from the computer CP1 to the interface IF1

| Instructions | Bus | Positions | Signal | Meaning |
|---|---|---|---|---|
| OTAo | YBP | 1 | Y1 | Call signal for IF1. |
| | | 2 | Y2 | Signal characterizing OTAo. |
| | | 4-7 | | Code 0000=C0. |
| | HBP | 13-16 | | Selection informations for Uj: CVj (13-16). |
| | | 1-5 | | Word selection code CW. |
| | | 6-12 | | Selection address code Cm (for Uj=SUj or SBUj). |

TABLE 3—Continued

Data transmitted from the computer CP1 to the interface IF1

| Instructions | Bus | Positions | Signal | Meaning |
| --- | --- | --- | --- | --- |
| OTA/INA(n) | YBP | 1 | Y1 | Call signal for IF1. |
| | | 3 | Y3 | Signal characterizing OTA/INA(n). |
| | | 4–7 | | For OTA byte: selection code for CB. For INA: Code 0000=C0. |
| | HBP | 1–16 | | New data to introduce in the word and the selected byte(s). |

through 7." The bit sent, for instance, on the wire 1 of the bus YBP can take one of the two values Y1 or $\overline{Y1}$. The same rank bit of the bus HBP can take one of the values H1 or $\overline{H1}$.

The Table 4 gives the meaning of the different code and operation symbols used in the FIG. 8 and the Tables 7, 8 and 9.

TABLE 4 : Code and operation symbols

| | |
| --- | --- |
| CO | Zero Code |
| CW | Selection word code |
| CB | selection byte code |
| CD1–CD4 | Data to store in the selected byte (s) |
| CV$j$ | Unit selection information |
| [YDP]T$f$(RIF1) | Transfer of the informations received on the bus YDP in the register RIF1 |
| (RIF2)T$f$(RSL1,RSL2) | Transfer of the content of register RIF2 in registers RSL1 and RSL2 |
| Z(RIF2) | Clearing of register RIF2 |
| CV$j$(13–16) | The content of positions 13 to 16 is the code CV$j$ |
| (RSL2 → CY1) | The content of register RSL2 becomes the code CY1 |

TABLE 5 SEQUENTIAL ADVANCE CONDITIONS

Y1.YO.SO → S1
Y1.S1.tS′ → S2
S2.tS′ → S3
S3.tS′ → S0

5. The interface and its operation 5.1 Generalities

The interface IF1 represented on the FIG. 5 comprises:

The flipflop F.

The sequential SQC mentioned when describing the FIGS. 2$a$ through 2$e$. Its advance conditions are given by the Table 5.

The registers RIF1, RIF2, RIF3 which connect the interface to the computer.

The preselection registers RSL1, RSL2 and the logic block LBL2 associated to RSL2.

The unit decoder DUN comprising $n$ outputs for the selection of the units U1, U2 . . . Uj . . . Un.

With each instruction OTAo, OTA or INA, the computer sends signals (seen Table 3) on two out of the three conductors 1, 2 and 3 of the bus YBP. An answer signal, elaborated for the condition Y2 + Y3 = YO, is sent to the computer on the bus DBP to inform it that the instruction has been well received.

We will now describe the operation of the interface for the two types of operations controlled by the computer : the selections and the data transfers.

5.2 The selections

As it has been seen previously the different selection informations are supplied by the initial instruction OTAo and by each one of the execution instructions. They are received on the busses YBP and HBP and stored, for the condition Y1.S1, in the registers RIF1 and RIF2.

5.21 Unit and address preselection : It is controlled by the informations received on the conductors 6–16 of the bus HBP1 during an initial instruction OTAo. As it can be seen on the FIG. 8, these informations are transferred in the register RSL1 at F.S2.tA and remain therein until the following instruction OTAo is received (clearing at time F.S2.tS). These informations are used in the following way :

a. Preselection of a multisignaller SU : As it has been said in paragraph 2 (FIG. 3), a multisignaller SU comprises a memory MSU with 96 addresses or "signallers". The selection of a signaller $m$ for the exchange of information with the computer CP is done asynchronously under the control of a time code Ct = Cm supplied by the computer CP and stored in the positions 6–12 of the register RSL1 (see FIG. 8). This code is characterized — as it has been seen in the paragraph 1 — by the fact that at least one of its two most significant bits is equal to one : the logical condition H6 + H7 (Table 6, equation 1) thus characterizes a multisignaller SU and the code CVj identifies the multisignaller SUj. This logical condition is done in the decoder DUN which comprises, for example, 14 multisignaller selection outputs if the switching center comprises 14 units of this type.

b. Preselection of a scanning and path search unit PSU : As it has been seen in the paragraph 2 (FIG. 3), the switching center comprises two units of this type referenced PSU1, PSU2 and the Table 2 shows that their input-output circuits are constituted by registers. Thus no address selection has to be provided for and the positions 6–12 contain the code CO. Particularly the logical condition $\overline{H6 + H7}$ indicates that the selected unit is not a multisignaller.

The code CVJ can take 3 values :

.CV1 for the selection of PSU1,

.CV2 for the selection of PSU2,

.CV3 for the simultaneous selection of PSU1 and PSU2.

The logical operation of selection (equation 2 of the Table 6) is done in the three-output decoder DUN.

c. Preselection of a scanning control unit SBU : In this case also we have the logical condition $\overline{H6 + H7}$. On the other hand, at least one of the bits 8–12 presents the value 1 which allows to differentiate a SBU from a PSU (equation 3 of the Table 6). The code CVj can take one of the three values, as for the PSU.

TABLE 6 : Unit selection signals

| Unit which must be selected | Logical conditions |
| --- | --- |
| SU$j$ | $U_j = (H6 + H7).CV_j$ (1) |
| PSU$j$ | $U_j = \overline{(H6 + H7)}.(\overline{H8.H9. \ldots H12}).CV_j$ (2) |
| SBU$j$ | $U_j = \overline{(H6 + H7)}.(H8H9+ \ldots H12).CV_j$ (3) |

As it can be seen on the FIG. 8, we have for a SBU two types of OTAo instructions:

Instructions OTAo for sending a program code CP identified by the logical condition $\overline{HB}$ (at least one of the bits 9–12 of this code has the value 1).

Instructions OTAo for selecting an address $m$ of the result memory MRE, this memory being described in the patent request referenced ($f$). The selection code CL = Cm of this address is then sent, and the instruction is identified by the logical condition H8.

Each of the 18 outputs of the decoder DUN which assume each one the selection of a SU, of a PSU or of a SBU, is connected to a bus such as IBI1 connected directly to the unit Uj (FIG. 6). The two outputs affected to the simultaneous selection of the two PSU or of the two SBU are each connected to a bus having acdess to both units.

5.22 Word preselection : It is done with informations received on the conductors 1–5 of the bus HBP1 during an initial instruction OTAo. As those received on the conductors 6–16, they are transferred in the register RSL2 at F.S2.tA and remain there until the following instruction OTAo is received. As shown in the Table 2, a word selection must only be done for the input and the output of a multisignaller SU and for the input of a path search unit PSU. Consequently, an instruction OTAo for a SBU comprises a code CO in the positions 1–5 of the register RSL2.

a. Principle of the word preselection : In a PSU, each one of the input registers Rg1–Rg5 can be preselected by one of the logical conditions H1–H5 which together constitute the selection code of the word CW. Thus, for example, if CW : 01011, it means that the order OTAo will be followed by three orders OTA (INA) concerning the inscription (the collection) of data, respectively in Rg2, Rg4 and Rg5 (Rg5).

In a SU, there are only two words M1, M2 to select and the bits 1–5 of RSL2 have been assigned as follows :

The bits 1 and 3 are affected to the selection of M1,

The bits 2 and 4 are affected to the selection of M2.

At time S2.tA of this instruction A1, the clock signal controls the resetting of the flipflop H1, which activates the gate Pa1, and LBL2 delivers the code CR2 : 01000 transmitted on the bus OBI at time S3.tS of the instruction A1 and at time S2.tS of the instruction A2.

At time S2.tA of this instruction A2, the flipflop H2 is reset so that the gates Pa1, Pa2, Pa3 are on. As the flipflops H1, H2, H3 are in the 0 state, the code CR3 = 00010 is transmitted on the bus OBI at time S3.tS of A2 and at time S2.tS of A3.

At last, at time S2.tA of A3, the flipflop H4 is reset and the code CO = 00000 is transmitted at time S2.tA.

It is thus seen that each word identification code CR1, CR2 etc is transmitted twice at a time tS for each instruction A1, A2 etc . . . ,first at time S3 of the preceeding instruction and second at time S2 of the instruction itself.

All these preselection information (Vj, Cm, CR1, CR2 etc . . . ) are transmitted to the unit Uj at a time slot tS and are stored until the following time slot tA. At that time there is performed a data collection and, eventually, a data modification in the case of an instruction OTA.

TABLE 7

Operation of the identification circuit

| Instruction | Bistable F | Logical condition | Operation | Value of the codes |
|---|---|---|---|---|
| OTAo | F | S2.tS | {[HBP]Tf(RSL2)CW {(LBL2)→CR1 | CW=11010 |
| | | S3.tS | CR1(LBL2)Tf[OBI] | CR1=10000 |
| A1 | $\overline{F}$ | S2.tS | CR1(LBL2)Tf[OBI] | |
| | | S2.tA | (LBL2)→CR2 | |
| | | S3.tS | CR2(LBL2)Tf[OBI] | CR2=01000 |
| A2 | $\overline{F}$ | S2.tS | CR2(LBL2)Tf[OBI] | |
| | | S2.tA | (LBL2)→CR3 | |
| | | S3.tS | CR3(LBL2)Tf[OBI] | CR3=00010 |
| A3 | $\overline{F}$ | S2.tS | CR3(LBL2)Tf[OBI] | |
| | | S3.tA | (LBL2)→CO | CO=00000 |

Figure 9:
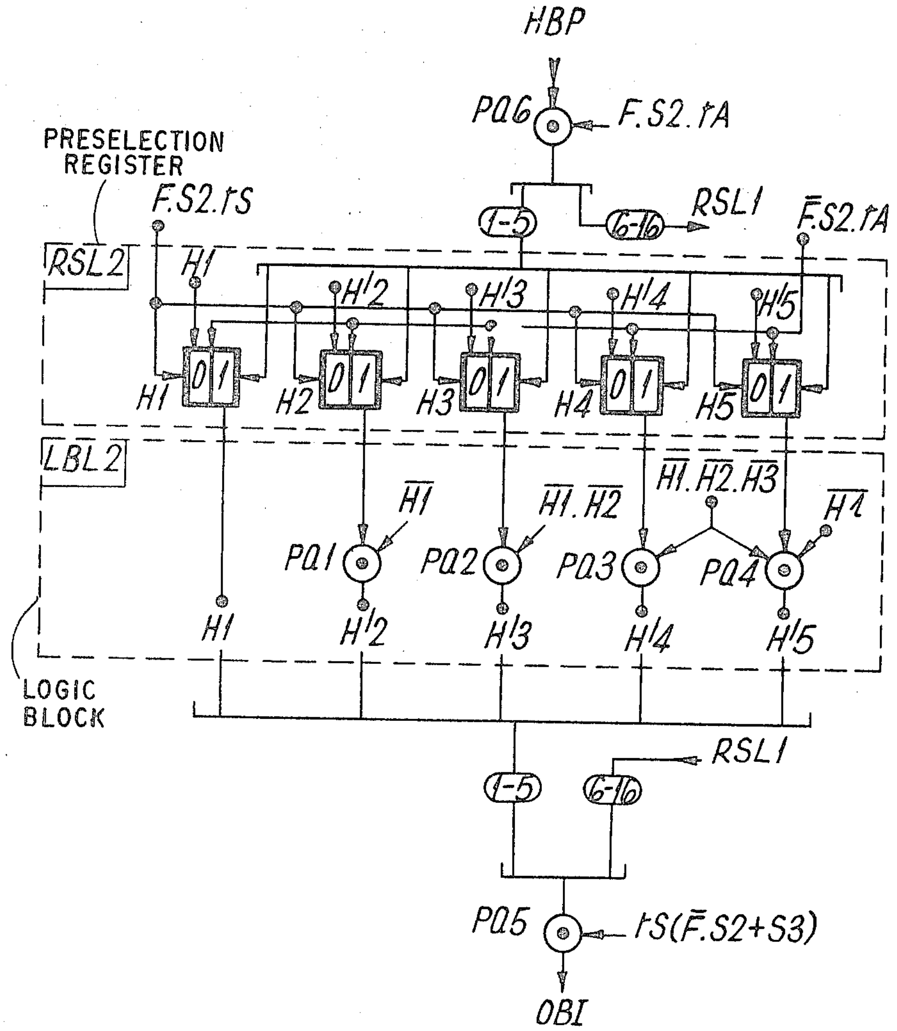
FIG. 9 represents the detailed diagram of the identification register.

These informations being processed in the order 1–2–3–4, it is seen that several selection arrangements can be obtained. Thus, for example, if CW = 1110, the first instruction OTA or INA concerns M1, the second concerns M2 and the third concerns M1. It is thus seen that, in the code CW, each bit characterizes a word and that the different bits must be processed individually and in time succession, starting by the leftmost bit.

b. Identification of the selection bit : The FIG. 9 represents the detailed schematic of the register RSL2 comprising the JK flipflops referenced H1–H5 and of the logical block LBL2 comprising the gates Pa1 through Pa4. The conductors 1–5 of the bus HBP on which the informations H1–H5 or $\overline{\text{H1–H5}}$ are transmitted are connected to the preset inputs of these flipflops so that, when the gate Pa6 is activated at F.S2.tA, the code CW supplied by the instruction OTAo is transferred in the register which was just cleared at time F.S2.tS.

Each flipflop of RSL2 receives, at time $\overline{F}$.S2.tA, a clock signal which resets it if a signal H1–H5 is applied at its 0 control input.

The logic block LBL2 comprises the gates Pa1-Pa4 which are controlled by the signals $\overline{\text{H1–H4}}$ taken on the 0 output of the flipflops of RSL2.

The Table 7 hereunder summarizes the operation of this register for the code CW = 11010. In this table the symbol CR1(LBL2) characterizes the code CR1 sent on the bus OBI by the circuit LBL2.

When receiving the code CW (instruction OTAo) there appears, on the outputs of RSL2, the conditions H1, $\overline{\text{H3}}$ and $\overline{\text{H5}}$ so that the gates Pa1–Pa4 are blocked. The circuit LBL2 then delivers the code CR1 = 10000 which is transmitted on the bus OBI at time S3.tS. This same code is retransmitted at time S2.tS after the reception of the following instruction A1 (first instruction OTA or INA).

5.3 The data transfers

We will now study the data transfer operations between the interface and the selected unit Uj. These operations are summarized in a detailed way in the tables 8 and 9. It will be noticed that :

The phases S1 and S3 are identical whatever be the instruction received from the computer CP.

The difference between an instruction OTA and an instruction INA lies in the fact that, for the latter, CB = CO, which means that there is no byte selection for writing.

In all cases, a data collection is done in the selected addresses even in the case of an instruction INA.

The operations concerning the instructions OTAo and OTA are easily understood with the help of the tables 8 and 9.

We will study in a more detailed way the data collection which, as previously seen, is done for an instruction OTA as well as for an instruction INA.

As it can be seen on the FIG. 5, the registers RIF1–RIF3 are connected to the computer for the logical condition Y1.S1 (Phase S1 of each instruction OTAo, OTA or INA), which coincides with the signal Pd of said computer (FIGS. 2*b* and 2*d*).

When looking in table 7, it is seen that a word preselection code CR1, CR2 etc . . . concerning a given instruction An is available (at the latest) at the end of the phase S2 of the preceeding instruction An–1. As it can be seen on the table 8, wherein the operations concerning the data collections are underlined, this instruction controls a preselection at the following phase S3 (at S3.ts) and the collected data is written in RIF1 at S3.tA. The result is that, when an instruction An of the type INA is received from the computer at Y1.S1, the required data is already written in RIF3 and is transmitted at the same time Y1.S1 towards said computer. As CB = CO, no writing is done at the following phase S2.

TABLE 8

Initial instruction OTAo (condition F)

| Phase | Logical conditions | Operations | Meaning |
|---|---|---|---|
| S0 | S0<br>Y2=Y0<br>Y1.Y2<br>Y0.Y1.S0 | Z(RIF2)<br>F<br>S1 | Confirmation signal identification of OTAo. |
| S1 | Y1.S1 | [YBP4-7]Tf(RIF1)<br>[HBP]Tf(RIF2)<br>(RIF3)Tf[IBP] | Code CO.<br>Reception of the preselection codes.<br>Data collected by the preceding instruction of type OTA or INA. |
| | $\overline{Y1}$.S1.t'S | S2 | |
| S2 | S2.F.tS<br>S2.F.tA<br>S2.tS' | Z(RSL1, RSL2)<br>(RIF1)Tf(RSL1, RSL2)<br>S3 | Transfer of the preselection codes in RSL1, RSL2. |
| S3 | S3.tS<br>S3.tS.d2<br>S3.tA.d2<br>S3.tS' | (RSL1, RSL2)Tf[OBI]<br>Z(RIF1, RIF2)<br>[IBI]Tf(RIF3)<br>S0 | Transfer to the units of the preselection informations Uj, Ct, CR.<br>Reception of data collected in Uj. |

TABLE 9

Execution instructions OTA or INA (condition $\overline{F}$)

| Phase | Logical conditions | Operations | Meaning |
|---|---|---|---|
| S0 | S0<br>Y3=Y0<br>Y1.Y3<br>Y0.Y1.S0 | Z(RIF2)<br>$\overline{F}$<br>S1 | Confirmation signal Identification of OTA or INA order. |
| S1 | Y1.S1 | [YBP4-7]Tf(RIFI)<br>[HBP]Tf(RIF2)<br>(RIF3)Tf[IBP] | CB (order OTA) or C0 code (order INA).<br>Codes CD1-CD4 (order OTA) or C0 (order INA). |
| S2 | S2.$\overline{F}$.tS<br>S2.$\overline{F}$.tA<br>S2.tS' | (RSL1, RSL2)Tf[OBI]<br>(RIF1)Tf[YBI]<br>S3 | Transfer to the units of the information of preselection Uj, Ct, CR.<br>Write command for an instruction OTA (CB ≠ CO). |
| S3 | S3.tS<br>S3.tS.d2<br>S3.tA.d2<br>S3.tS' | (RSL1, RSL2)Tf[OBI]<br>Z(RIF1, RIF3)<br>[IBI]Tf(RIF3)<br>S0 | Transfer to the units of the preselection informations Uj, Ct, CR.<br>Reception of data collected in Uj. |

6. The input-output circuit of a peripheral unit

A circuit UIO as shown on the FIG. 6 is associated to each peripheral unit. This circuit is addressable by any of the interfaces IF1, IF2 (FIG. 3), being clearly understood that the computers CP1, CP2 have means to exchange informations through the circuit IPC in order to avoid that the same unit is addressed at the same time by both interfaces.

Therefore an unit Uj has access, by its circuit UIO, to the following busses busses connected to IF1 : UBI1, YBI1, OBI1, IBI1.

busses connected to IF2 : UBI2, YBI2, OBI2, IBI2.

As seen previously, a signal UJ1 or Uj2 appears during a phase tS + tA only on one of the busses UBI1 or UBI2.

This signal is used to control :

1. at tS.b : — the transmission to the unit, on the bus Ea1, of the preselection codes Cm, CP, CW.
2. at tA : — the transmission to the unit, on the bus Ee, of the byte selection code CR that controls the write operation.

the transmission to the unit, on the bus Ea2, of the data to write in the case of an instruction OTA.

the transfer to the interface of the data collected in the unit and received on the bus Eb.

While the principles of the above invention have been described in connection with specific embodiments and particular modifications thereof it is to be clearly understood that this description is made by way of example and not as a limitation of the scope of the invention.

We claim:

1. An interface circuit coupled over a plurality of connectors between a computer and peripheral units of a PCM switching center to provide retiming of clock signals between a clock in the computer and a clock in the PCM switching center, said interface circuit comprising a four-position sequencer having four output terminals S0, S1, S2 and S3 and three input terminals coupled to respective connectors, said initial output occurring at S0, said sequencer responding to instructions via a first signal occurring at a selected time slot from the computer to advance the output to terminal S1, said sequencer responding to a second signal appearing after the end of the first signal to control the setting of the sequencer to position S2, and the following two signals controlling the setting of said sequencer respectively in position S3 then in position S0 when said following two signals represent the leading edge of a synchronous time signal at the time of the clock in the PCM switching center.

2. A circuit as claimed in claim 1 in which a computer sends data and instructions concerning the address of a peripheral unit to said interface circuit, and said interface circuit includes means for processing said instructions without modifying the content of the address and transmitting the data through to the peripheral circuit.

3. An interconnection circuit according to claim 1, in which a computer provides preselection information over a bus connecting the computer to the interface, the interface includes an identification circuit which provides a word preselection code based on said preselection information and busses are provided joining the interface to the peripheral units to convey said preselection code to the preselected peripheral unit and thereby supply control to said unit.

4. An interconnection circuit according to claim 1, in which a bus is provided joining the interface to the peripheral units, means are provided for transmitting the content of each instruction over the bus to the peripheral units at times controlling the reception of the information by a selected unit and means applying a code signal over said bus to control the writing at the address of the selected unit.

5. An interconnection circuit coupled between a computer and peripheral units of a time multiplex PCM switching center, comprising a plurality of connections to a computer, an interface circuit coupled to a number of computer connections, a plurality of multisignallers coupled to the interface circuit, a plurality of scanning and path search circuits coupled to the interface, a plurality of scanning control circuits coupled to the interface circuit, the computer sending an instruction during a duration defined by a time slot signal appearing at each of a number of repetition periods and having a fixed time duration, the interface circuit including a four-position sequential circuit which is set in an initial position, the reception of an instruction during the said time slot controlling the advance of this sequential circuit to a second position, the first signal appearing after the end of the time slot signal controlling the setting of the sequential in a third position and the two following signals controlling the setting of said sequential respectively in a fourth position and then in the initial position, a further signal characterizing the leading edge of a synchronous time signal at the time of the switching center.

* * * * *